United States Patent [19]
Kita et al.

[11] Patent Number: 5,777,618
[45] Date of Patent: Jul. 7, 1998

[54] METHOD AND APPARATUS FOR GRAPHICAL PANNING

[75] Inventors: Ronald Allen Kita, Hollis, N.H.; Kaare Hedeman Klevjer, Westford, Mass.; Ramesh Hero Vaswani, Nashua, N.H.

[73] Assignee: Digital Equipment Corporation, Maynard, Mass.

[21] Appl. No.: 729,894

[22] Filed: Oct. 15, 1996

Related U.S. Application Data

[63] Continuation of Ser. No. 412,510, Mar. 29, 1995, abandoned, which is a continuation of Ser. No. 100,007, Jul. 29, 1993, abandoned.

[51] Int. Cl.[6] .................................................. G06F 15/00
[52] U.S. Cl. ............................................................ 345/418
[58] Field of Search .................................. 395/118, 133, 395/425; 345/433, 434, 435, 418, 123, 189, 190

[56] References Cited

U.S. PATENT DOCUMENTS 4,874,164  10/1989  Miner et al. .......................... 345/189
5,121,483  6/1992  Monahan et al. ...................... 395/275

*Primary Examiner*—Phu K. Nguyen
*Attorney, Agent, or Firm*—Rama B. Nath; Arthur W. Fisher

[57] ABSTRACT

A system and method for rapid panning of graphics images stored as objects in an object records database. The system comprises a computer with memory or memories divided into a several memory regions. The computer is coupled to a monitor for displaying graphics files stored in the database. The memory regions include: a virtual map (VMAP) region including cell maps comprising pointers to linked lists of objects in the database; a backing store region storing a bitmapped image of an entire file, and having the same effective dimensions as the VMAP; a main store region storing a smaller portion of the bitmapped image, the main store region having the same pixel dimensions as a viewing region on the monitor and a movable main store viewing window which permits a view of the subset of the bitmap. When the user pans across the image, the ready, bitmapped image from the large backing store is rapidly copied to the main store and blitted to the screen, avoiding delays due to rendering a bitmapped image from the database or VMAP. Alterations to the image or to the viewing window will update the VMAP and the backing store simultaneously, eliminating update delays to the monitor when panning is executed.

12 Claims, 9 Drawing Sheets

METHOD AND APPARATUS FOR GRAPHICAL PANNING

This application is a continuation of application Ser. No. 08/412,510, filed Mar. 29, 1995 now abandoned which is a continuation of Ser. No. 08/100,007, filed on Jul. 29, 1993 now abandoned.

BACKGROUND OF THE INVENTION

The present invention is directed to the display of graphics on a computer on a monitor, and in particular to the rapid access to and display of large graphics files. Many applications today rely upon the graphical display of their information, particularly spreadsheet programs, commercial "paint" or "draw" programs (such Claris Corporation's "MacDraw Pro", Deneba System's "Canvas", and Adobe System's "Photoshop"), and CAD (computer-aided design) and electronic circuit (schematic) design applications.

Graphics applications like these are capable of generating very large files, containing perhaps hundreds or thousands of objects whose structures and relationships, stored in an object records database of the computer, can be quite complex. A large file may map onto an effective display region many times larger than the display available to the computer. In order to display a given file, the computer must generate a bitmap from the objects in the object record database, "blit" it to a video random-access memory (VRAM), and output it to the monitor.

The rate at which the computer can accomplish this depends upon many factors, including the clock rate of the processor, the sharing of the processor by other active applications or by clients on a network (if the computer is a server), and the size and complexity of the graphic being displayed.

A graphic being displayed on a monitor will be frequently altered by the user, and the user will also pan from one portion of the graphic to another, to view regions not visible on a single screen. Thus, a graphical document may consist of dozens of pages, only one of which is visible on the screen at any time, and the user will typically wish to move freely among the pages. Because of the requirement that the graphic be bitmapped and blitted at each page turn or each repositioning of the graphic on screen, changing the user's view can be quite time-consuming, and can considerably limit the rate at which documents can be viewed and modified.

It is conventional in current systems to store the bitmapped document in a backing store, which is a region of memory in the computer dedicated to this function, and as the document is modified, to update the backing store along with the object records database. When the user moves an object, for instance (by clicking and dragging), or deletes an object, the database is updated, and the screen is refreshed. When the user pans to a region of a document that is off-screen, this amounts to directing a command to the computer to retrieve from the database a portion of the document corresponding to coordinates different from those on the display at the moment. The computer must calculate the new screen coordinates, determine to which database coordinates those new screen coordinates correspond, and then render the newly accessed region for bitmapping into the backing store and blitting to screen. This can be a complicated and lengthy procedure, and during this time the processor is either unavailable for other processes or is further slowed down by them.

There is therefore a need for a system which solves these problems, by providing a new approach to the rendering and displaying of graphics that will eliminate the wait time for recalculations when a user modifies a document or access a different region for viewing.

Compounding the existing problem of rapid display of different portions of a large document is the recent proliferation of ever smaller handheld and laptop computers, with concomitantly smaller screens. Graphics displayed on such screens represent an even smaller portion of an entire file, and further limit the speed at which a user can access and display, and hence edit or view, the objects in a file.

SUMMARY OF THE INVENTION

The system of the invention provides for the rapid display of computer graphics, by using a backing store in connection with a virtual map (VMAP), in addition to a conventional main store. The VMAP includes a large matrix of cell maps, where each cell map has a pointer to a linked list of cells, and each cell in turn includes one pointer to an object in the object records database, and another to the next cell in the linked list. Access to a given cell on the screen is translated to access to corresponding database coordinates, which is mapped onto the VMAP.

In this way, all of the objects at any given region on the screen are rapidly accessed. They are bitmapped to the backing store, which has dimensions that are the same as those of the VMAP, and thus includes a bitmap of the entire file. Both the VMAP and the backing store are constantly updated as the graphic is modified. If the user wishes to display a different region of the document, the command is sent to the backing store, which already includes the bitmap for the new region, and it can then be blitted to the screen essentially as fast as the refresh rate of the screen. There is no wait time for the processor to analyze the relationships among the objects to be displayed, or to bitmap the objects to the backing store.

The backing store and VMAP can be updated in the background, so that they are always ready for a panning or modification operation. In this way, the delays inherent in conventional systems are eliminated.

The preferred embodiment was originally designed for use with applicant's State Transition Editor (STE) application, for modifying graphic displays of extended finite state machines (EFSMs). Since these tend to be large and complex, the current invention is particularly suited for this, as well as for the display of files created by the aforementioned graphics applications.

The invention utilizes an offset between the database coordinates and the backing store (screen) coordinates for all display maneuvers. It has been implemented by applicant as part of the STE application, and the completed implementation is a multiple window graphical tool that allows the user to edit EFSMs. It can be equally applicable to other graphics applications.

DESCRIPTION OF THE PREFERRED EMBODIMENTS

The description is divided into sections and attached appendices as listed below.

I. Hardware of the Invention

II. Structure of the Virtual Map, Backing Store and Main Store

III. VMAP Structures Defined

IV. Method for Graphical Panning

Introduction

As mentioned, the actual implementation of the graphical panning system of the invention is a part of applicant's larger STE system, and the invention as embodied in that system will be described. The STE system makes use of the new concepts of the VMAP and backing store described above. The structure of and relationships among the VMAP, backing store and main store are described in detail in Sections II–IV below, whereafter Section V discusses the method of the invention in this setting.

I. Hardware of the Invention

Figure 1:
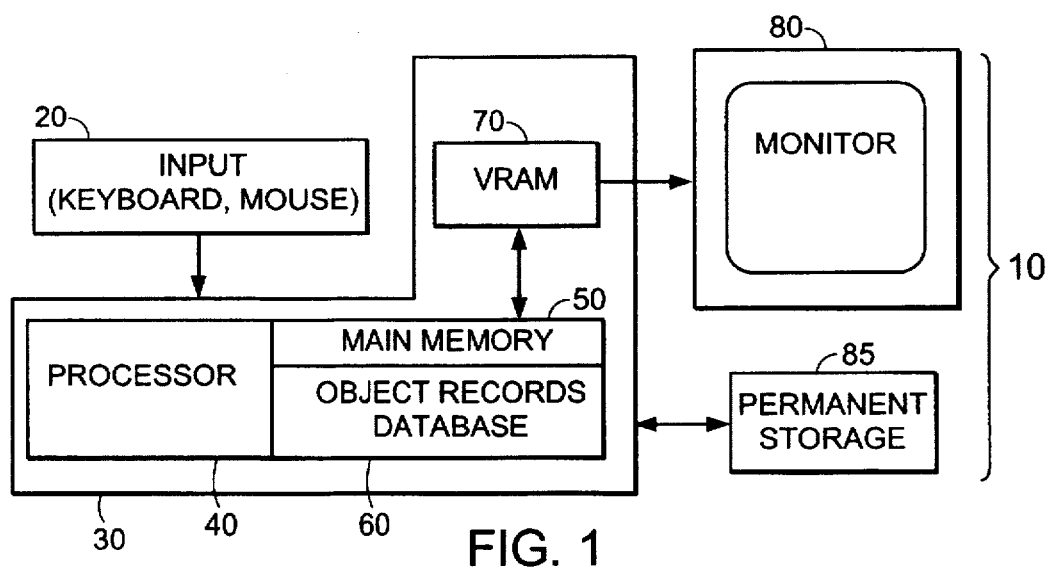
FIGS. 1 and 2 are block diagrams of apparatus for implementing the present invention.
Figure 2:
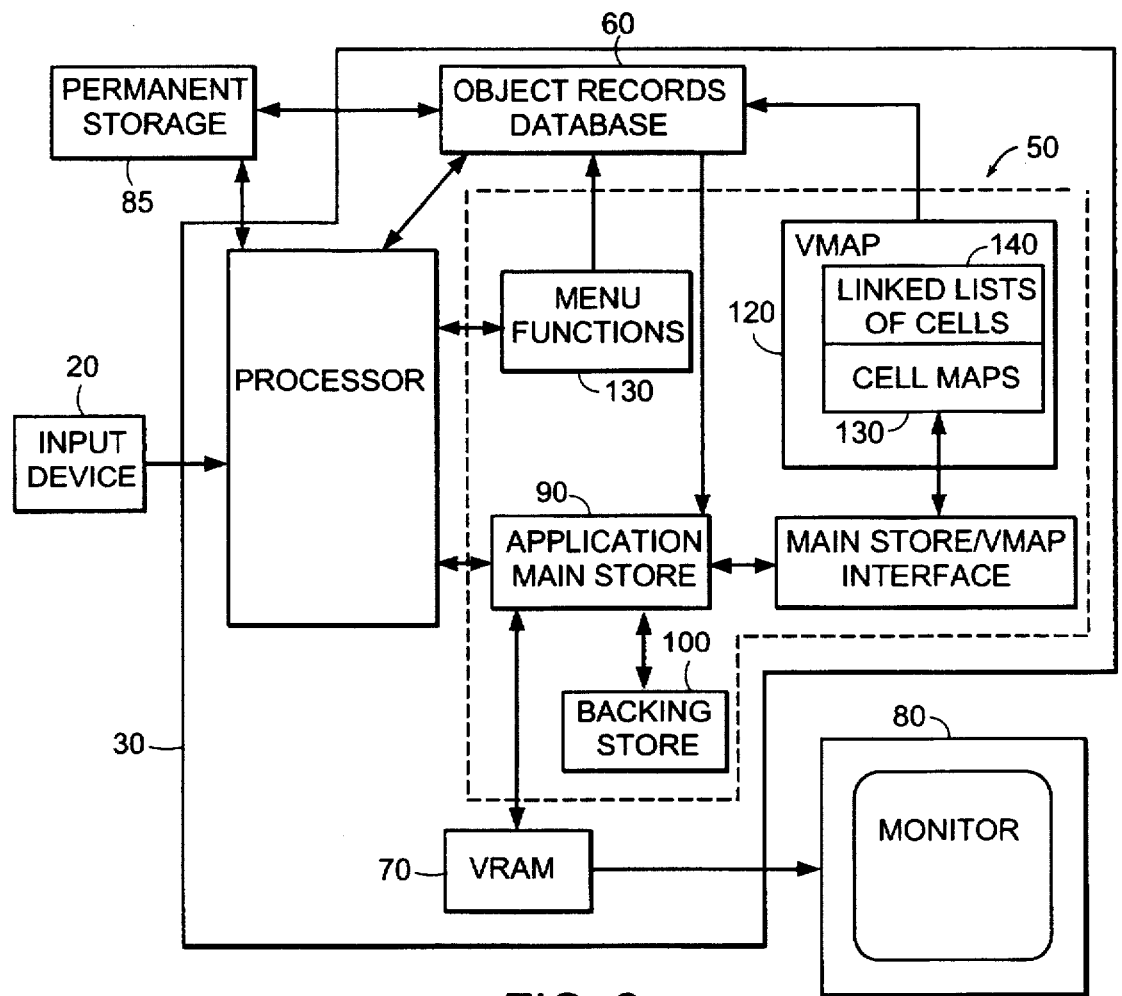

FIGS. 1 and 2 are block diagrams of hardware for implementing the present system 10 for schematic routing. The system includes an input device 20, which may be a keyboard, mouse, pen-driven input, touch screen, or any other conventional means for inputting data by a user, both graphical and textual. The input device is coupled to a computer 30, which may be broadly taken to be a personal computer, a workstation, a terminal connected to a central server, or the like. Computer output is displayed on a monitor 80.

The computer 30 is conventional, including a processor 40 coupled to a main memory 50 with an object records database (or "objects database") 60 (which may, if desired, be stored elsewhere than in the main memory, or may be a subset thereof). Permanent storage 85 (which may be a disk drive, tape backup, etc.) provides stable storage of the data in the database 60.

The main memory 50 is coupled to video random access memory (VRAM) 70, which is in turn coupled to the monitor 80. Thus, the system 10 is adapted for displaying objects in the database 60, in a manner to be described.

FIG. 2 shows greater detail of the main memory 50 (surrounded by the dotted line). In application main store region 90, the main memory 50 stores a graphics application, which may be an electronic schematic design application, a CAD program, a drawing program without "intelligent" objects (i.e. a conventional "paint" or "draw" application), or another conventional graphics program, and may in particular be applicant's State Transition Editor (STE) application, by which the examples in this application were generated. The graphics application to be used with the invention may alternatively be stored in a separate region from the main store region 90.

The STE application is specifically designed for the generation and editing of extended finite state machines (EFSMs), including applicant's architectures of multiple-model EFSMs. Such architectures are not specifically the subject matter of the present disclosure, but as mentioned the instant invention is useful in connection building them, as well as other types of graphical structures. As noted above, however, the invention is suitable for application to any graphics program.

Input to the system in FIGS. 1 and 2 may be one of two types, the first being functions from menus or keyboard commands (such as store, delete, etc.), which are routed through the menu functions software module 130 to access and manipulate the object records database 60. The menu functions are standard operating system functions used in systems using a database.

Alternatively, mouse or keyboard commands that affect the graphics objects displayed on the monitor 80, such as commands within the application stored in the main store region 90, are routed through the region 90.

The main store region 90 includes not only the graphics application itself, but also a block of memory reserved for data which is blitted (prepared pixel by pixel) to VRAM 70 and to the monitor 80 for display. The main store region 90 is coupled to a backing store region 100, which includes a subset of the data in the main store, used in a manner to be described.

The main store region 90 is also coupled via an interface 110 (which is a software module) to a virtual map (VMAP) region 120, which includes cell maps 130 and a block 140 including linked lists of cells, the latter being coupled to the object records database 60.

Modifications to objects can be carried out by keyboard commands, but are preferably accomplished by a mouse, trackball, computer pen, or the like, using a graphical interface. The input device 20 is thus used to manipulate objects appearing on the monitor 80. When a change is input by the user, it is carried out in the main store 90, and is communicated to the VMAP 120 via the interface 110. The main store 90 includes information about the x-y position (horizontal and vertical displacement) of the object that the user is manipulating. The interface 110 converts the x-y position to a memory location of a cell map stored in region 130. The appropriate cell map includes a pointer to a corresponding linked list stored in region 140, and that linked list is updated as necessary. Modifications, deletions, etc. of an object are communicated via the linked list region 140 to the database 60, and are implemented there. The data in the database 60 is ultimately stored in the permanent storage 85.

When the system is shut down, all information is typically lost except that stored in the storage 85 (assuming the use of volatile memory for main memory 50). Thus, when the system is started up, the processor loads the information in the storage 85 into the database 60, and the main store 90 is loaded from the database 60. This information from the main store region 90 is used to build up both the information in the VMAP region 120 and the information in the backing store region 100.

II. Structure of the Virtual Map, Backing Store and Main Store

Figure 3:
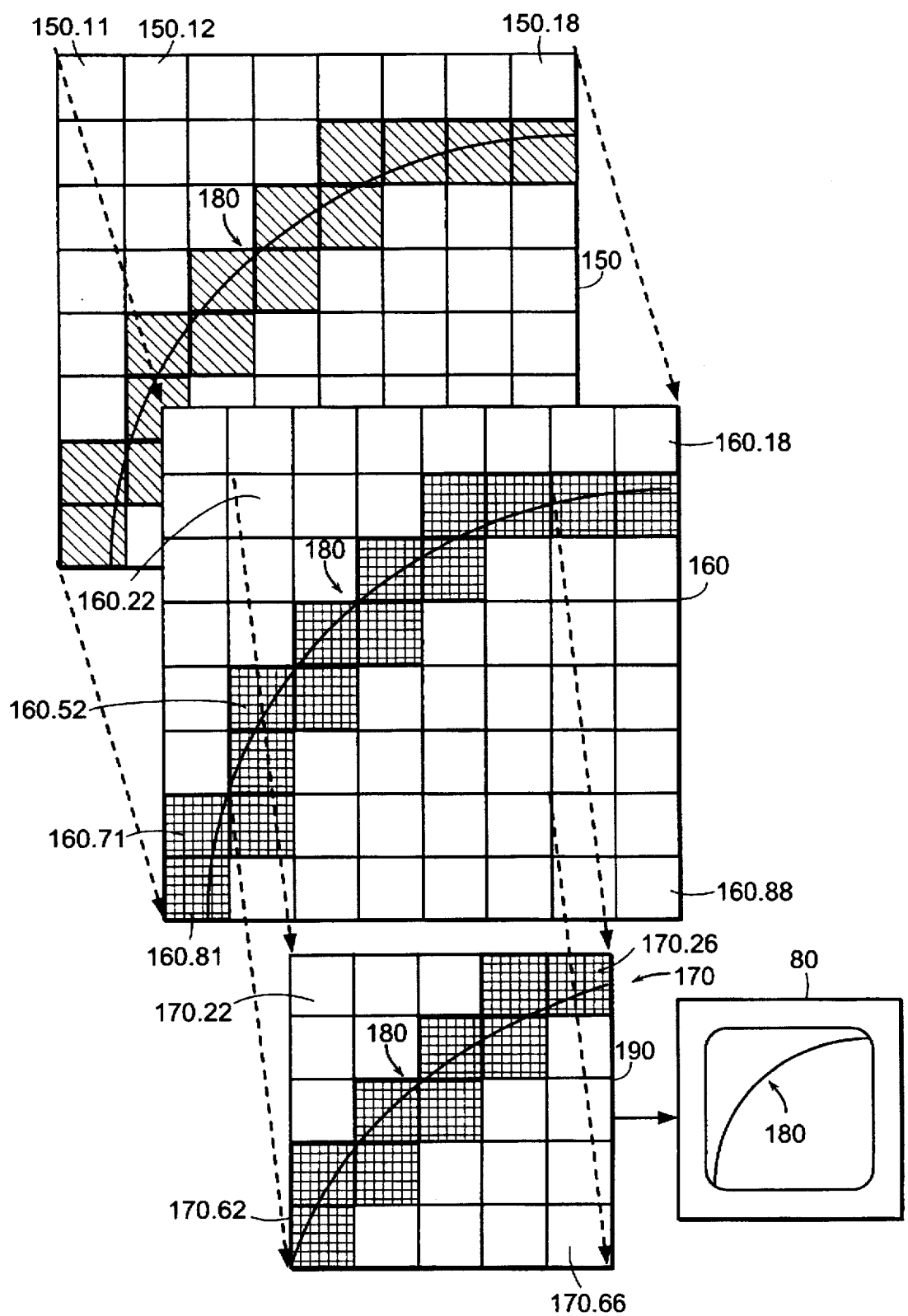
FIG. 3 is a relational diagram of a virtual map, backing store and main store for the system of the invention.

The backing store region 100 is conventional in the field of video display technology. It includes a pixel map of the data that is to be displayed on the monitor 80. FIG. 3 is a diagram illustrating the relationships between VMAP 150 stored in the VMAP region 50, display data 160 stored in backing store region 100, and a subset 170 of that display data stored in main store region 90. (Data 160 may simply be referred to as "backing store (data)", and data 170 as "main store (data)".) These data are graphics data, so their representation in FIG. 3 is an example of a how a particular graphic display of such data might look. The only graphical object being displayed in this example is arc 180.

The VMAP 150 is divided into a grid of cell maps, which are numbered for reference by a decimal suffix indicating their row and column position: 150.11 (first row, first column), 150.18 (first row, eight/last column), 150.81 (eight row, first column), and so on. The VMAP 150 in this example thus includes an 8×8 matrix of cell maps 150.11 to 150.88.

Each cell map 150.11, etc. corresponds to an array (for display) of a predetermined number of pixels; in the preferred embodiment this number is 8, so one cell map represents 64 pixels. Thus, the VMAP 150 in this example represents an (8×8) array of cell maps, each including (8×8) pixels, for a total of (8×8)×(8×8)=4096 pixels. The structure of the cell maps will be explained below.

The number of pixels that a cell map represents is a compromise between object display resolution and the amount of memory needed to store the objects; other dimensions for the cell maps may be used, but 8×8 pixel has been found to be an acceptable compromise in applicant's system for the size of one cell map. On the other hand, an actual VMAP would include an array of perhaps 750×750 cell maps, representing (at 8×8 pixels per cell map) 3000×3000= 9,000,000 pixels. The 8×8 VMAP 150 of FIG. 3 is kept small for the purposes of illustration.

The cell maps 150.11 through 150.88 correspond one-to-one with the backing store's pixel regions 160.11 through 160.88, respectively, which are not all numbered in the FIG. 3, but are assigned decimal suffixes in the same manner as cell maps 150.11 through 150.88. Each pixel region 160.11–160.88 is thus an 8×8 region.

The main store data 170 is a subset of the backing store data 160, and includes data corresponding to a display region 190 whose corners are pixel regions 160.22, 160.62, 160.66 and 160.62; thus, pixel regions 170.22, etc. are numbered in the same fashion, with like numerical suffixes indicating corresponding pixel regions.

The monitor 80 displays the contents of the main store 170, and has the same pixel dimensions. The dimensions in this illustration are (8×8=64 pixels per pixel region)×(5 pixel regions horizontally by 5 pixel regions vertically), or 320× 320 pixels.

In a display sense, then (though not in a memory-usage sense), the VMAP 150 and the backing store 160 are the same "size", i.e. have the same dimensions; the same is true of the main store 170 vis-a-vis the monitor 180.

In the example of FIG. 3, the object stored in each of VMAP 150, backing store 160 and main store 170 is the arc 180; it is partly displayed on the monitor 180. This arc is stored as an object in the object records database 60 (see FIG. 2), as an object in the VMAP, and as a bitmap in the main store and backing store. It is blitted for display via the VRAM 70.

The cell maps traversed by the arc 180 in the representation of the VMAP 150 will be referred to as "active" cell maps; thus, cell maps 150.81, 150.71, 150.72, 150.62, 150.52, etc. (i.e. the cross-hatched cell maps) are active. The corresponding regions 160.81, 160.71, etc. and 170.62, 170.61, etc. are shown with all of their pixels (eight per region). The non-active regions are not detailed in this fashion, for the sake of clarity of the drawings; however, they also consist of 8×8-pixel boxes.

Figure 4:
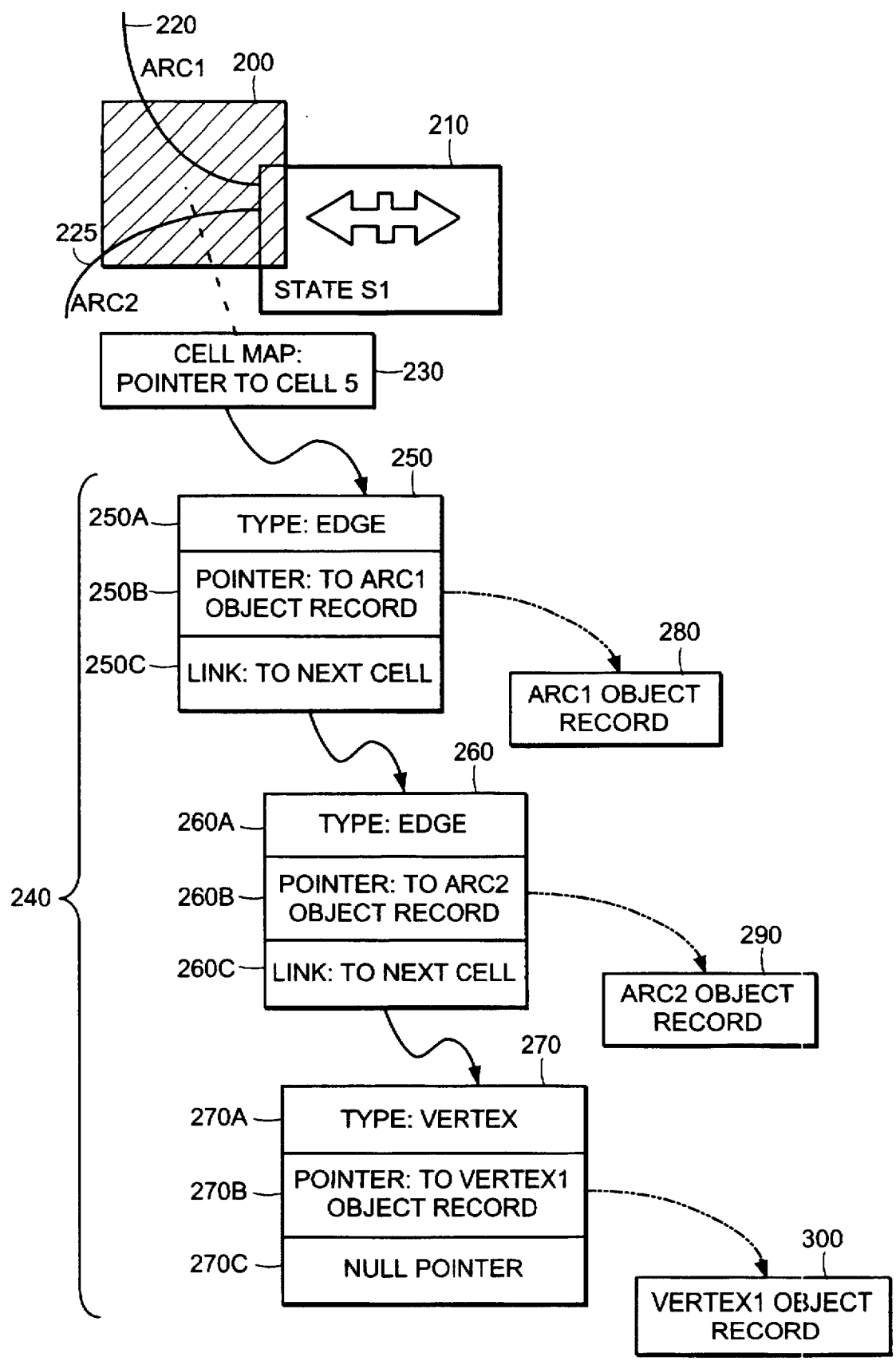
FIGS. 4 and 5 are diagrams showing the relationships between a virtual map, linked lists and object records.

The structure of the VMAP 150 is illustrated in FIG. 4, showing a single active cell map 200 occupied by three objects: a state icon 210, an arc 220 named "arc1", and an arc 225 named "arc2". These arcs and the state are standard objects in the representation of a finite state machine (FSM), but may be any graphical objects.

The cell map 200 corresponds to any of the cell maps 150.11, etc. shown in FIG. 3. Each cell map such as cell map 200 contains a pointer such as pointer 230, which points to a linked list 240 of cells 250, 260 and 270. The cell maps are stored in the cell maps region 130 of the VMAP 120, and each linked list is stored in the linked list region 140 (see FIG. 2).

Each cell includes a type field (250A, 260A, 270A), an object record pointer (250B, 260B, 270B), and a linking pointer (250C, 260C, 270C). The pointers 250B–270B point to object records 280, 290 and 300, respectively, stored in the object records database 60.

The type field 250A identifies arc1 as an "edge", which is a standard term in finite state machines for an arc representing a transition from one state to another. Arc2 is similarly identified, and state 210 is identified as a "vertex", which is a standard FSM term for a state, i.e. a point of connection between two transitions, representing a particular configuration of the FSM.

The linked list 240 contains one cell for each object in the cell map 200. Cell 250 corresponds to arc1, and its linking pointer 250C points to the cell 260 corresponding to arc2. The linking pointer 260C, in turn, points to the next cell 270, corresponding to the state icon 210. There are no other objects in cell map 200, so the linking pointer 270C is a zero pointer.

When an object is deleted or moved from cell map 200, the corresponding cell is likewise deleted. Thus, if arc2 is deleted or moved, cell 260 is deleted from the linked list 240 in the linked list storage region 140 of the VMAP 120. Linking pointer 250C is then modified to point instead to cell 270. If the arc2 has been moved, then the linked list corresponding to some other cell map in the VMAP has a new cell added to it, that new cell the same structure as cell 260—except for the linking pointer, which will be a zero pointer, since the new cell will be added to the top of the linked list already existing at the new location. (The new cell could be placed anywhere in the linked list, including at the end. However, that would require more time and steps, since the lower down on the list it goes, the more links have to be traversed to locate the end of the list.)

Figure 5:
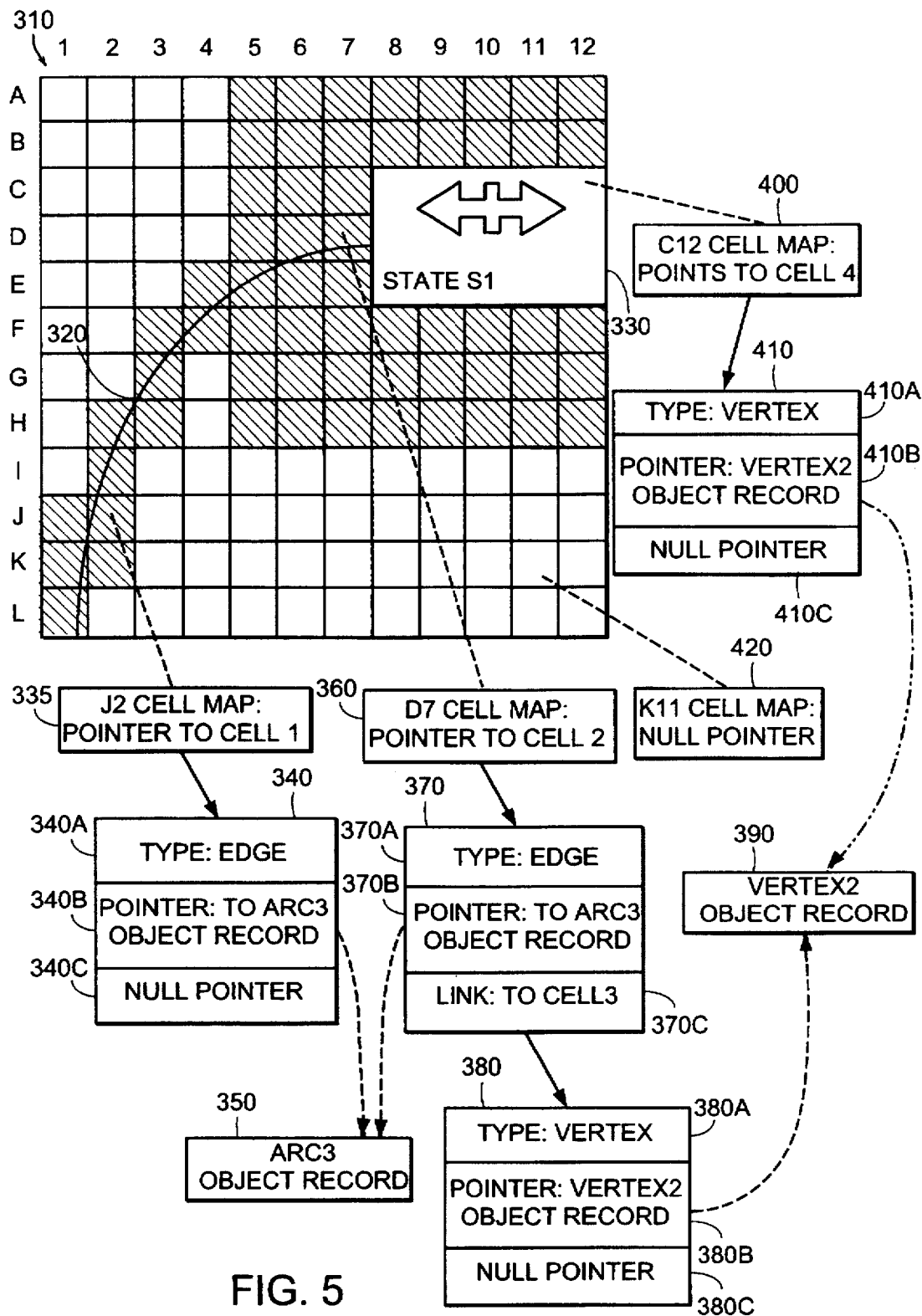

FIG. 5 shows a portion of a typical VMAP 310, with cell maps assigned alphanumeric coordinates A1 through L12 for the sake of this discussion. The cell maps in this figure have the same structure as those in FIG. 4. An arc 320 (named "arc 3") crosses the region, and connects to a state 330 (i.e. an icon representing a state). The following cell maps are made active by the position of the arc 320:

D6–7; E4–7; F3–4; G3; H2–3; I2; J1–2; K1–2; and L1. State 330 has a three-deep set of active cell maps surrounding it (though other depths are possible). The cell maps made active by the position of state icon 330 include all of those in the rectangle bounded as follows:

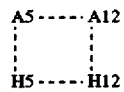

This includes the cell maps underlying the state icon 330.

Cell map J2 includes a pointer 335 to cell 340 (or "cell 1"), which in turn has a pointer 340B to the arc 3 object record 350. Arc 320 also passes through cell map D7, so the corresponding pointer 360 points to cell 370 (or "cell 2"), which in turn has a pointer 370B to the same object record 350 for arc 1. It also includes a linking pointer to cell 380 ("cell 3"), which itself includes a pointer to object record 390 corresponding to state icon 330.

Cell map C12 has only one object in it, namely the state icon 330, and includes a pointer 400 to cell 410 ("cell 4"). Object record pointer 410B points to object record 390 for that state, and includes a NULL linking pointer 410C. Cell map K11 is empty, and thus it includes only a NULL pointer 420.

III. VMAP Structures Defined

The discussion in Section III above is sufficient to implement the features of the invention. Following is an example (using conventional C language) of how data structures for the VMAP might be defined.

The VMAP 120 is a collection of data structures, created in memory for each model (i.e. connected graph, such as in FIGS. 6–17) when it is opened. The VMAP is provided primarily for two reasons: to provide quick retrieval of model objects (vertices, edges, text) by XY coordinates, and to quickly find available space for placement of vertices, edges and text.

As noted above, the VMAP covers the same x-y coordinate range as the object records database 60 and the backing store 100. See FIG. 3. The two-dimensional matrix of cell maps that make up the VMAP are instances of a defined structure which can be called "ste_cell_map", indexed by x and y coordinates.

All translation between database coordinates (pixels) and VMAP coordinates (cell maps) is done by one set of functions ("ste_cnv_funcs") in the interface 110.

Data structures for the VMAP include:

```
typedef struct _ste_cell_map      ste_cell_map;
typedef struct _ste_cell          ste_cell;
struct _ste_cell_map
{
    ste_cell       *cell_ptr;
};
```

The pointer "cell_ptr" points to the first member of a linked list of occurrences of structure "ste_cell", or a "NULL" pointer if there are no model objects in this box. This is shown in the examples of FIGS. 4 and 5.

The structure "ste_cell" is a next-pointer and a type/pointer combination to a model object:

```
struct _ste_cell
{
    ste_cell           *next_cell_ptr;
    ste_cell_type      type;
    union
    {
        VERTEX         *vertex_ptr;
        EDGE           *edge_ptr;
    } ptr;
};
```

The pointer "next_cell_ptr" points to the next occurrence of structure ste_cell in a linked list, or a "NULL" pointer if this is the last cell in a link. The linked lists are either those pointed to by instances of "ste_cell_map" as described above, or it is one linked list of currently unused "ste_cell" occurrences, pointed to by "free_cell_ptr":

ste_cell *free_cell_ptr;

The structure "type" is one of the following:

```
typedef enum
{
    ste_vertex_cell           = 0, /* Cell points to vertex */
    ste_edge_cell             = 1, /* Cell points to edge   */
    ste_t_i_registration_cell = 2, /* Cell points to edge   */
    ste_action_text_cell      = 3, /* Cell points to edge   */
    ste_predicate_text_cell   = 4, /* Cell points to edge   */
    ste_event_text_cell       = 5, /* Cell points to edge   */
    ste_test_text_cell        = 6, /* Cell points to edge   */
    ste_constraint_text_cell  = 7, /* Cell points to edge   */
    ste_dashed_arc_cell       = 8  /* Cell points to edge   */
}
ste_cell_type;
```

The pointer "ptr" is either "vertex_ptr" or "edge_ptr", depending on "type", this option being provided by the "Union" type declaration. It points directly to the model object in the object records database.

All objects that exist in a ste_cell_map's box will be pointed to by "ste_cells" in this ste_cell_map's list of cells. The edge "ste_t_i_registration_cell" is a special edge_cell that is at the midpoint of an edge's arc, or at the tip of a looped arc (such as arc 502.2.1 in FIG. 6). A "looped arc" is one that begins and ends at the same vertex (icon or state). The text cells indicate where the curved text associated with the edges are. The text indicates the test information, event, predicate or other function associated with edge to which it is adjacent. Such text appears in the examples of FIGS. 6–17. The "dashed arc cell" will be explained in connection with the arc routing method.

These data structures are always maintained as the user creates, deletes and moves model objects. The "ste_cell_map" and "ste_cell" structure occurrences are not freed until a map is closed (i.e. stored).

IV. Method for Graphical Panning

The method of the invention uses two coordinate systems to determine which region of the graphical file stored in the database is to be displayed. The first is the database coordinate system, which is conventional and is used by such applications as XWindows. The second coordinate system is the graphics (window) coordinate system, i.e. the coordinate system relative to the origin of the particular window being displayed, which in general will be different from the database coordinate, since there is generally an offset of a view window from the database origin. These coordinate systems will be discussed below in connection with FIGS. 8 and 9.

Figure 6:
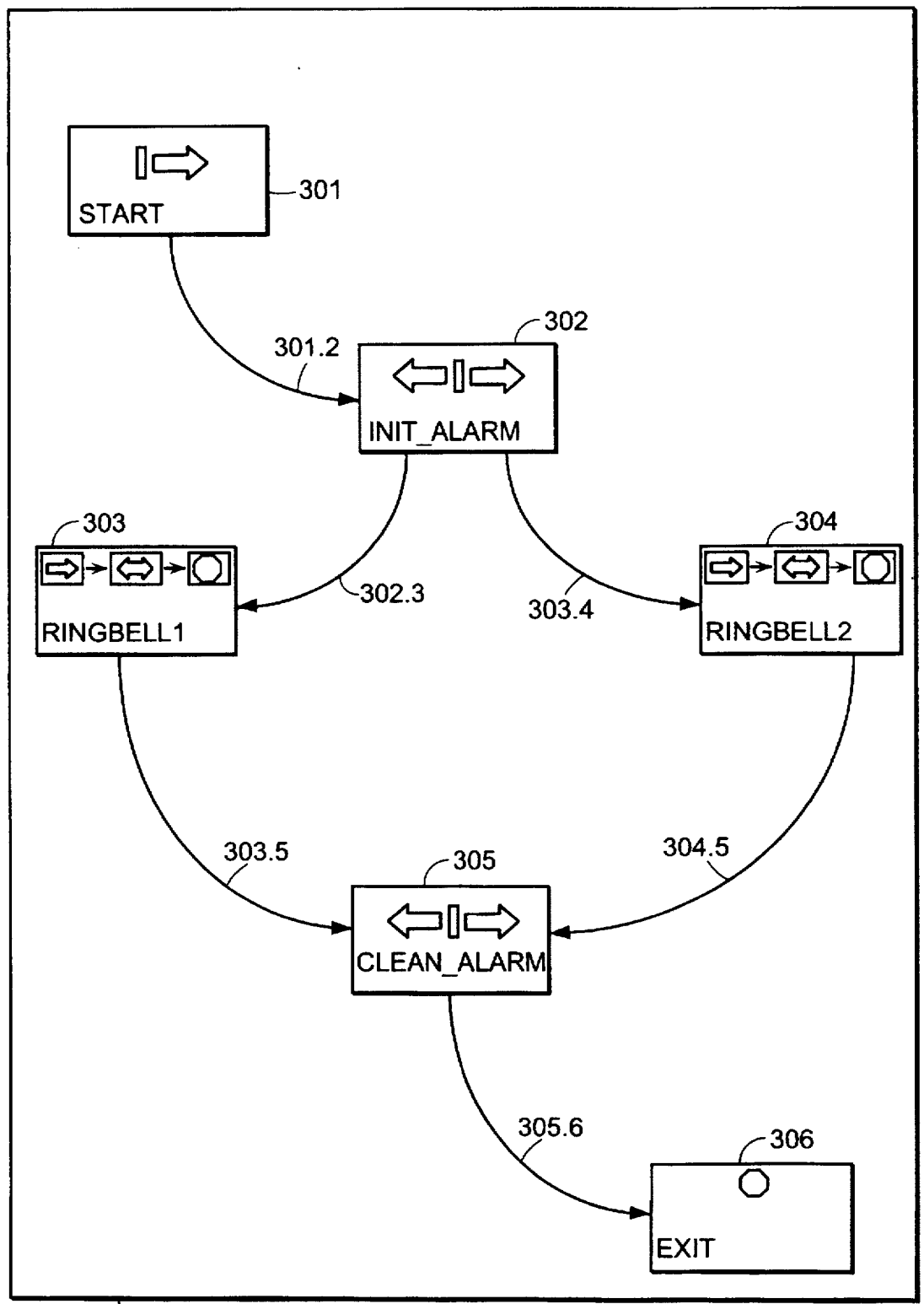
FIG. 6 represents a graphic stored in the virtual map.

FIG. 6 is a representation of the objects that might be stored in the entire object records database 60 (shown in FIG. 2). This is an EFSM that is displayed for editing and viewing. Its function is not relevant here; it could be any extended graphic, where only a portion of the graphic is viewable on the monitor at any given time due to dimension constraints.

Figure 7:
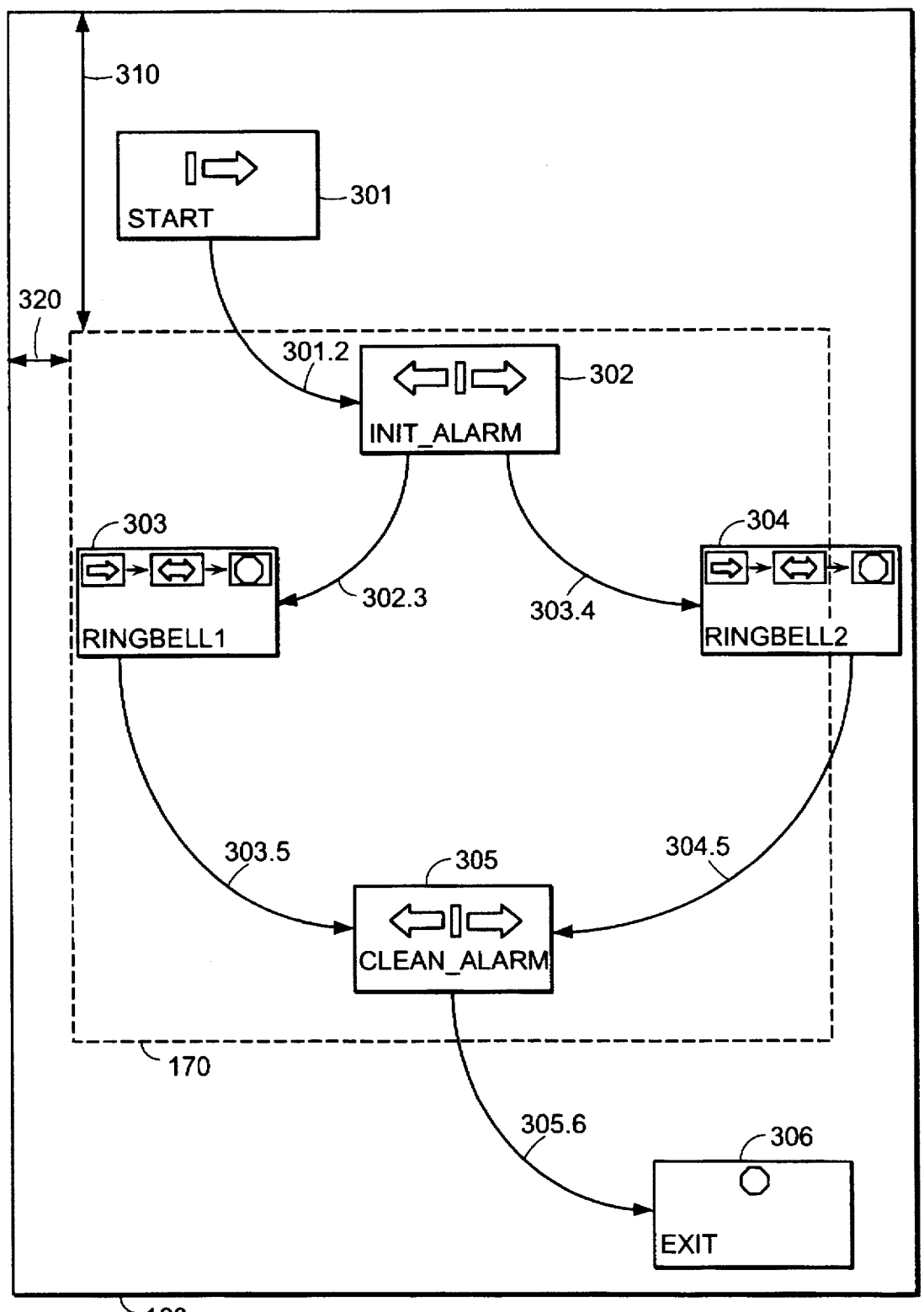
FIG. 7 shows the graphic of FIG. 6 overlapped by the backing store dimensions.

The objects in FIG. 6 (icons 301, 302, etc. and arcs 301.2, 302.3, etc.) are stored as object records, as discussed above, and the VMAP 120 stores cell maps (corresponding to coordinates in the backing store), the cell maps being pointers to linked lists of cells that in turn have pointers to the objects in the database. Thus, FIG. 6 serves to illustrate graphically the relationships among the objects stored by the VMAP and the database if they were all to be displayed simultaneously, and is the same as the bitmapped image stored in the backing store memory region 100. FIGS. 6 and 7 accordingly reference the large bounding box on the graphic as (backing store) 160.

FIG. 7 shows the dimensions of the main store 170 superimposed upon the backing store 160. Certain objects are clipped by the main store boundaries, namely icon 304 and arcs 301.2, 304.5 and 305.6. The area within the dashed line is what would be displayed on the monitor 80 (compare with FIG. 3, which shows a simpler version of the same effect).

Figure 8:
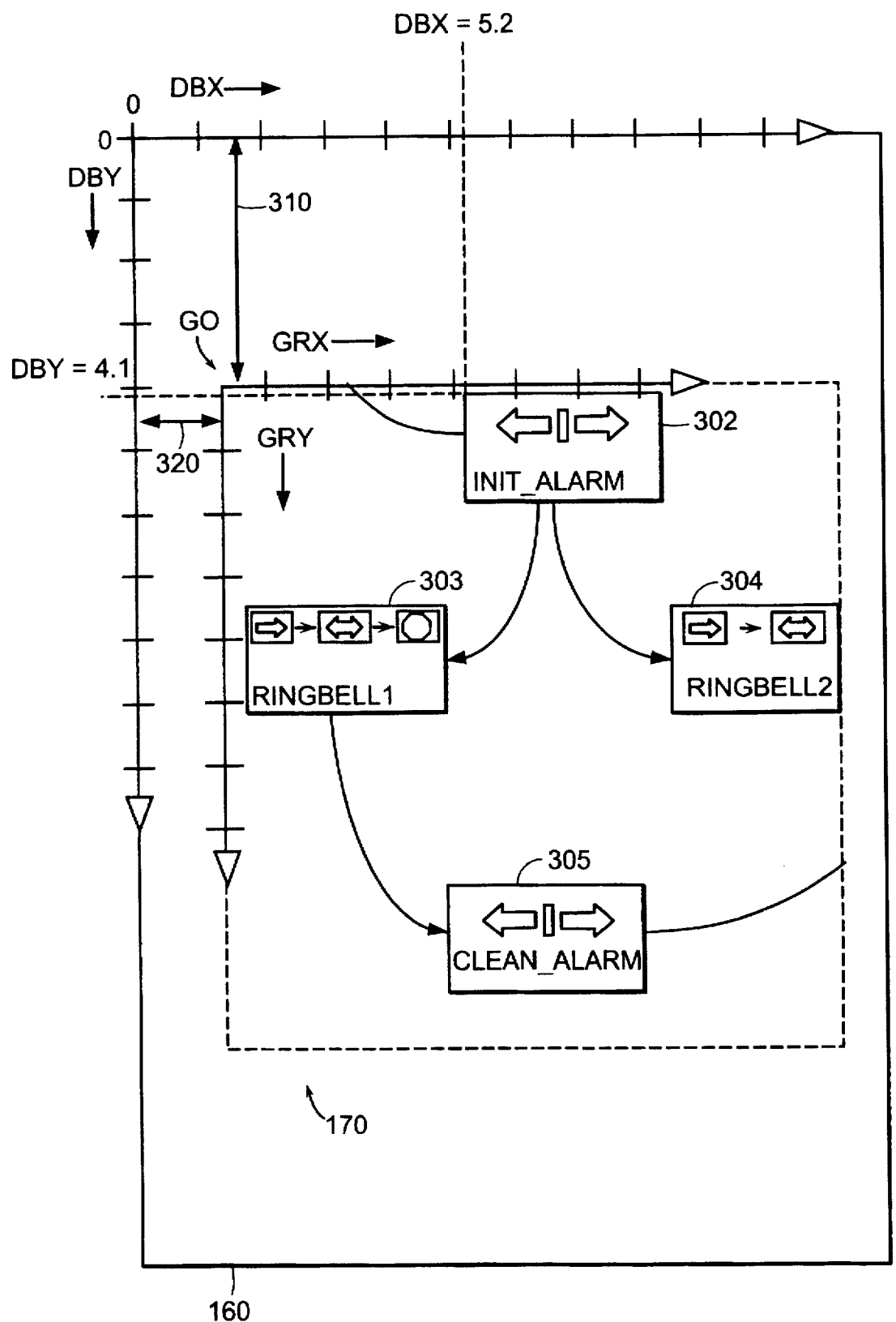
FIG. 8 shows the region of FIG. 6 actually displayed on the screen.

The view onto the backing store 160 via the main store 170 is determined by the x-offset 320 and y-offset 310 between the database coordinates and the window (or graphics) coordinates of the objects in FIG. 7. FIG. 8 shows this more clearly. The graphic coordinates are measured relative to the grx and gry axes in the upper left of the main store box 170. The database coordinates of any object are measured using the dbx and dby axes in the upper left of the backing store box 160. Both the database and graphic coordinates are conventional systems used in such commercial applications as XWindows. See XLib Reference Manual for Version 11, Release 4 (December 1991) (especially Volume Two), by O'Reilly & Associates of Sebastapol, Calif., which is incorporated herein by reference.

The position of the upper left corner of the main store box 170 (i.e., the origin GO of the graphics coordinate system) is measured as an offset from the origin of the database coordinate system. This offset in FIG. 8 is approximately (offset_x, offset_y)=(1, 4).

Icon 302 in FIG. 8 has its upper left corner (a typical reference point in graphics applications) at approximately (dbx1, dby1)=(5.2, 4.1). By inspection, it can be seen that that same corner is approximately at coordinates (grx1, gry1)=(4.2, 0.1). In general, the database coordinates and the graphics coordinates are related by:

$$grx=dbx-offset\_x$$

$$gry=dby-offset\_y$$

Thus, given the database coordinates of any object and the offset of the window in which it is displayed, the system can perform a simple calculation to determine the coordinates within to window at which to display the object.

When the user pans within the window, i.e. moves to view a different portion of the entire graphic object in memory, this amounts to relocating the window offset (the position of the origin GO) relative to the database coordinates origin. In a typical graphics program, this is a matter of selecting one or more objects on screen and moving them to an off-screen position, or using a move or scroll commands to view a different portion of the document. Both of these may generally be referred to as "panning".

Figure 9:
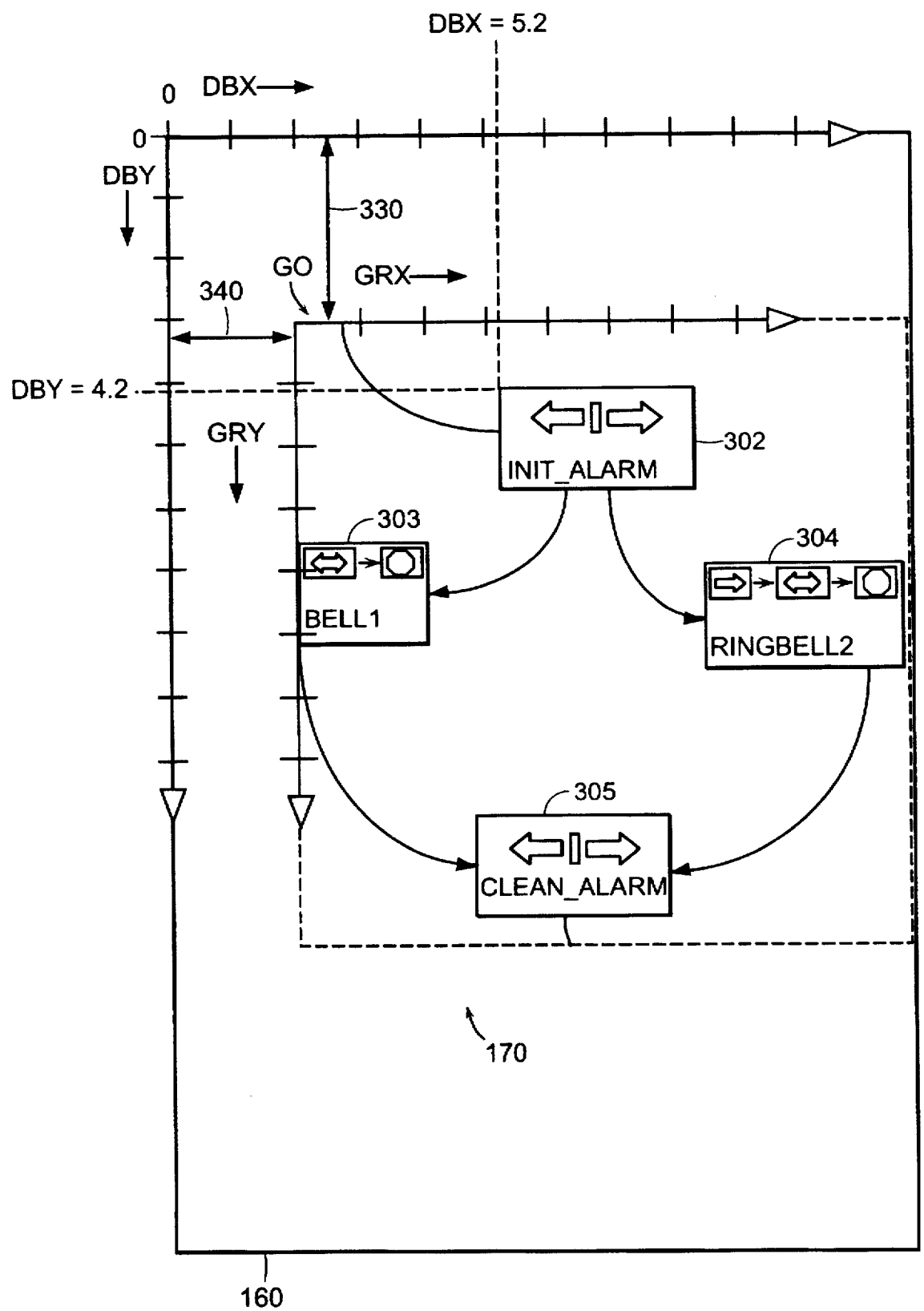
FIG. 9 shows a new region of the graphic of FIG. 6 after a panning operation.

A panning operation is illustrated in FIGS. 8 and 9. In FIG. 8, as noted, the offset of the window origin GO is (1,4), and the icon 302 is at database coordinates of (4.2, 5.2). In FIG. 9, the offset GO has been moved to approximately (offset_x, offset_y)=(2, 3), expressed as database coordinates. Note that icon 302 and the other objects are stationary relative to the database coordinate system; icon 302 is still at (5.2, 4.2). This is because the objects' absolute positions are always calculated as a function of the database coordinates.

Relative to the graphics coordinate system, however, the icon 302 and other objects appear to have moved. By the above formulas, the new graphic coordinates of upper left corner of icon 302 are:

$$grx2=dbx1-offset\_x=5.2-2=3.2$$

$$gry2=dbx1-offset\_y=4.1-3=1.1$$

The window position of (3.2, 1.1) as calculated agrees with the apparent position of the icon 302 in FIG. 9.

In effect, then, it is the main store window 170 that has moved, and not the document. However, since the window is stationary relative to the monitor's screen (or a selected viewing area of the monitor, which needn't be the entire screen), it appears that the document is moving, resulting in the panning effect. In practice, when an object is drawn in the main storage, it is drawn relative to the windows origin. For instance, following is a known XWindows command (API) to draw an arc:

| XDrawArc(display, window, defaultGC, grx, gry, width, height, alpha, gamma) | |
|---|---|
| Display *display | /* display pointer */ |
| Window window | /* drawable window id */ |
| GC defaultGC | /* graphics context */ |
| int grx, gry | /* coordinates relative to window origin */ |
| int width, height | /* width and height of the window */ |
| int alpha, gamma | /* major and minor angles */ |

A panning operation in a conventional system requires the re-rendering of the image that was bitmapped in the backing store. This is a known procedure, involving recalculation of object positions from the object records database for every panning operation. It is primarily this rendering process that is so time-consuming in prior systems.

In the present invention, in contrast, the main store 170 can be refreshed from the backing store 160 for any panning operation, because the backing store already contains in it a bitmap for every object of the object records database 60, i.e. has the same dimensions as the VMAP. Whenever an object is deleted, moved, modified or added, the application sends the updated information to the VMAP memory 50 (see FIG. 2) and the main store memory 90 simultaneously, and the backing store memory 100 is also updated. The database 60 is likewise kept up to date. Thus, at all times the backing store memory 100 is kept synchronized with the VMAP memory 50 and the database.

This means that the system is ready for essentially instant viewing of any portion of a document, limited only by refresh rate and other commands competing for the processor. The method proceeds according to the following steps:

1. Grab the cursor.
2. Copy all affected bits (i.e. all those in the viewed region of the backing store) to the main store memory, clipping by the bounds of the visible window.
3. Track the cursor with an event handler, which is SET on the following events: (1) mouse or track ball press, (2) release, and (3) motion. Continue copying to the main store region as long as the cursor is in motion.
4. If a non-motion event occurs, i.e. some event other than the three SET events listed above, compress all motion events, if necessary, and scan the event queue for non-motion event. Filter out the motion events to get the most recent non-motion event, and process that one.
5. Update the window offset.
6. Release the cursor.

Each of these steps can be carried out using the structure of the invention by otherwise conventional techniques. For instance, the XWindows application may be used in conjunction with the present invention, and includes routines corresponding to the above steps. Step 1 could be done by the XGrabPointer( ) routine, and step 2 by the XCopyArea( ) routine.

Step 3 is doable by XtAddEventHandler. The event handler for this step should heed only events (1), (2) and (3) listed in step 3, though other events may occur, in which case the panning operation is interrupted to carry out those events. The compression of motion events is necessary only if panning gets ahead of refreshing the screen with the new regions to be displayed, such as if the user pans very fast or if there are other commands in the event queue, slowing down the processor's handling of the motion events.

As long as motion (panning) continues, i.e. one of the three events listed in step 3 is taking place, step 4 is carried out: the interrupts are carried out, if necessary, and any necessary compression is effected. In short, panning continues with necessary interrupts until the user stops moving the cursor or releases the mouse button. This can be accomplished by using an XWindows command such as While (XCheckEvent(display, window, &event) !=MotionEvent); (Execute non-motion events)

The pan (window) offset is updated once the motion events are completed, in step 5, which can be done in XWindows by XtMovewidget ( ). The pan offset is then set at release of the mouse button (or trackball button, computer pen, or other input device), and the release of the pointer in step 7 may be carried out by the XWindows command Xungrabpointer ( ).

From the foregoing it will be appreciated that no panning operation requires the bitmapping of data from the VMAP or object records database. Because of the synchronized update of the backing store and the database and VMAP, and because the backing store is the same effective size as the VMAP, panning is extremely fast. In applicant's actual implementation, panning is so fast that there is a microfiche viewer effect; that is, there is no appreciable delay between a pan operation and the viewing of the new portion of the document. This is an effect not known from prior systems.

The combination of the VMAP, backing store of the same dimensions, and main store of smaller dimensions might be considered disadvantageous, since the very large backing store (perhaps 9,000,000 pixels) and VMAP (the same) consume a large amount of RAM. However, as memory becomes smaller and cheaper, this is less significant, and the greatly improved display performance is a tremendous advantage.

Figure 10:
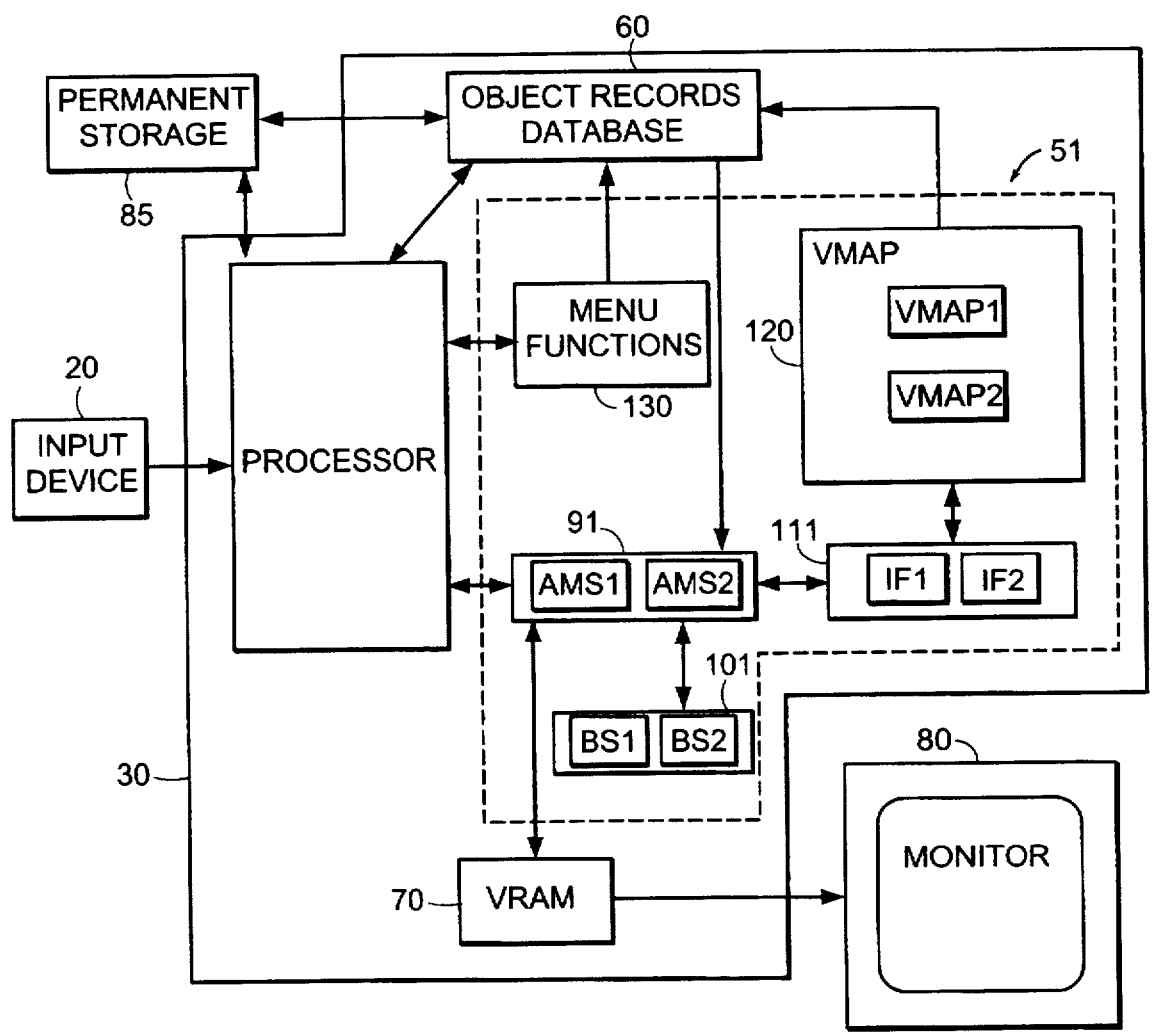
FIG. 10 is a block diagram of the system of the invention in a configuration suitable for a windows-type implementation.

The panning method is well suited for a windows environment. FIG. 10 shows suitable apparatus for such an implementation. It is similar to FIG. 2, except that there are two (or more) each of the VMAPs (VMAP1 and VMAP2 in multi-VMAP region 51), interfaces IF1 and IF2 in interface region 111, application/main store regions AMS1 and AMS2 in main store region 91, and backing stores BS1 and BS2 in backing store region 101. The application in this implementation carries out functions similar to those of the Apple Macintosh® operating system or of the XWindows application, namely opening multiple windows on top of one another. Each backing store, VMAP and main store has the same structure as described above, and each set (1 and 2) keeps track of its own database of object records (the database being divided for this purpose). At the windowing application level, information is maintained about which window is at the top layer, which at the second layer, and so on. The layers are drawn according to conventional routines.

With the embodiment of FIG. 10, any desired number of applications may be running simultaneously, and each independently enjoys the advantages of the rapid panning operation of the invention. In this way, multiple applications with different displayed information, graphics or otherwise, may be open, or multiple instances of the same application may be open, and access to all display information in all open windows may be had without appreciable delay.

Other applications will be apparent to those in different fields. For instance, animation can be greatly sped up if background information is stored in the backing store, and changing foreground information may be in a different backing store, so that motion against the static background is rapid and only the relatively small amount of new or altering information needs to be re-rendered. With this and other applications, a multilayer system can be built up, with independent, manually controlled or automatic (e.g. animated) panning of any layer available, changing the viewing window onto the backing store on the basis of a panoply of predefined manually or automatically triggered events.

We claim:

1. In a computer system having a monitor, a memory, a database storing object records, and a monitor for displaying information, the combination of:

an application region of said memory for storing an application having means for displaying first information from a file, on the monitor;

means for rendering said first information into a bitmap, the bitmap containing subsets of the bitmap and all objects in said database;

a backing store region of said memory for storing the bitmap;

a main store region of said memory for storing a first subset of the bitmap smaller than the entire bitmap but having a dimensional size that is the same as the dimensional size of a viewing region on said monitor; a movable main store window which permits a view of a subset of the bitmap, the first subset having a size and position relative to the bitmap corresponding to a first window view of the main store;

means for copying said first subset to said main store region;

means for displaying the first subset of the bitmap in said viewing region;

view altering means for moving the main store window for altering the first window view to a second window view for viewing a second subset of the bitmap, said second subset being different from said first subset;

wherein said copying means is also for copying said second subset to said main store region, and said displaying means is also for displaying said second subset in said viewing region.

2. The system of claim 1, wherein said view altering means comprises user input means coupled to the computer.

3. The system of claim 1, wherein said view altering means comprises a portion of said application for automatically altering the viewing region.

4. The system of claim 1, further including a virtual map coupled to said database, for cell maps relating to each of a plurality of pixel regions of said backing store region, the virtual map and backing store being of substantially equal dimensions.

5. The system of claim 1, the virtual map further including a linked list of cells corresponding to each said pixel region, each said linked list identifying all objects in said database with display coordinates at the corresponding pixel region.

6. The system of claim 4, further including means for updating the virtual map and the backing store substantially simultaneously upon alteration of the viewing region and upon modification to any objects in the database.

7. A method of rapid panning of a bitmapped image containing subsets on a monitor coupled to a computer having a memory including a main store region and a backing store region, the memory storing an application for generating the image in a viewing region, the bitmapped image being generated from a file stored in a database in said memory, the bitmapped image being stored in said backing store region of the memory, said main store region having a dimensional size equivalent of a viewing region of said monitor, said method including the steps of:

copying a first subset of the image from the backing store region to a main store region of the memory using a movable main store window, the first subset corresponding to a first viewing window position onto the backing store region, and the backing store region having dimensions larger than dimensions of the main store region;

displaying said first image subset in said viewing region;

upon a predefined event, moving the main store window to alter the first viewing window position to a second viewing window position on the backing store region;

copying a second image subset of the image from the backing store region to the main store region, said second subset corresponding to said second viewing window, said second subset being different from said first subset; and displaying said second image subset in said viewing region.

8. The method of claim 7, wherein said predefined event is a user event input to said computer.

9. The method of claim 7, wherein said predefined event is an event generated by said application.

10. The method of claim 7, further including the step of generating a virtual map of the image, the virtual map including a cell map corresponding to each of a plurality of cell regions in said viewing region and having substantially the same effective display dimensions as said backing store region.

11. The method of claim 10, further including the step of maintaining a pointer correlated with each said cell map, each said pointer pointing to a linked list of cells referencing objects in said database.

12. The method of claim 10 further including the step of updating said virtual map and said backing store region, upon occurrence of a predefined event altering said image.

* * * * *